US008877674B2

(12) United States Patent
Dagle et al.

(10) Patent No.: US 8,877,674 B2
(45) Date of Patent: Nov. 4, 2014

(54) SELECTIVE CO METHANATION CATALYSIS

(75) Inventors: Robert A. Dagle, Richland, WA (US); Yong Wang, Richland, WA (US); Guanguang Xia, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 1568 days.

(21) Appl. No.: 11/413,129

(22) Filed: Apr. 26, 2006

(65) Prior Publication Data

US 2007/0253893 A1 Nov. 1, 2007

(51) Int. Cl.

| | |
|---|---|
| B01J 23/00 | (2006.01) |
| B01J 23/02 | (2006.01) |
| B01J 23/08 | (2006.01) |
| B01J 23/40 | (2006.01) |
| B01J 23/42 | (2006.01) |
| B01J 23/56 | (2006.01) |
| B01J 21/04 | (2006.01) |
| B01J 20/00 | (2006.01) |
| C01B 3/58 | (2006.01) |
| B01J 35/00 | (2006.01) |
| B01J 23/46 | (2006.01) |
| B01J 35/10 | (2006.01) |

(52) U.S. Cl.
CPC ........ *C01B 3/586* (2013.01); *B01J 2219/00781* (2013.01); *C01B 2203/047* (2013.01); *B01J 21/04* (2013.01); *B01J 35/1019* (2013.01); *B01J 35/002* (2013.01); *B01J 23/462* (2013.01); *C01B 2203/0445* (2013.01); *B01J 35/006* (2013.01)
USPC ........... 502/327; 502/332; 502/355; 502/415; 502/439

(58) Field of Classification Search
USPC .......................... 502/327, 355, 415, 439, 332
See application file for complete search history.

(56) References Cited

U.S. PATENT DOCUMENTS

| | | | | |
|---|---|---|---|---|
| 3,183,278 A | * | 5/1965 | Koch, Jr. ........................ | 585/268 |
| 3,554,929 A | * | 1/1971 | Aarons ......................... | 502/178 |
| 3,615,164 A | | 10/1971 | Baker | |
| 3,617,511 A | * | 11/1971 | Jenkins et al. ................ | 208/112 |
| 4,171,288 A | * | 10/1979 | Keith et al. .................... | 502/304 |

(Continued)

OTHER PUBLICATIONS

Yaccato et al., "Competitive CO and CO2 methanation over supported noble metal catalysts in high throughput scanning mass spectrometer," Applied Catalysis A: General 296 (2005) 30-48.

(Continued)

*Primary Examiner* — Cam N. Nguyen
(74) *Attorney, Agent, or Firm* — Frank Rosenberg; Derek H. Maughan

(57) ABSTRACT

Carbon monoxide (CO) is selectively reacted with hydrogen ($H_2$) over a ruthenium (Ru) on alumina catalyst at a temperature of about 210 to about 290° C. To be a viable option for micro catalytic fuel processing devices, highly active, selective, and stable catalysts must be demonstrated with as large a temperature window for feasible operation as possible. We have studied the effects of metal loading, preparation method, pretreatment conditions, and choice of support on the performance of Ru-based catalysts for such applications. Catalyst testing results and catalyst characterization using XRD and BET are discussed. In one example, operating at a gas hourly space velocity (GHSV) of 13,500 $hr^{-1}$, a 3% $Ru/Al_2O_3$ catalyst yielded CO outputs less than 100 ppm in a temperature range from 240° C. to 285° C., while not exceeding a hydrogen consumption of 10%. This catalyst was further successfully demonstrated in a microchannel device.

17 Claims, 10 Drawing Sheets

(56) References Cited

U.S. PATENT DOCUMENTS

| | | | | |
|---|---|---|---|---|
| 4,358,399 | A * | 11/1982 | Antos | 502/174 |
| 5,618,772 | A * | 4/1997 | Suda et al. | 502/238 |
| 5,641,723 | A * | 6/1997 | Bonnemann et al. | 502/326 |
| 5,811,624 | A * | 9/1998 | Hantzer et al. | 585/700 |
| 5,904,913 | A | 5/1999 | Bohm et al. | |
| 6,207,307 | B1 | 3/2001 | Van Keulen | |
| 6,235,962 | B1 * | 5/2001 | Zeuthen | 585/700 |
| 6,241,876 | B1 * | 6/2001 | Tsao et al. | 208/137 |
| 6,551,960 | B1 * | 4/2003 | Laine et al. | 502/327 |
| 6,919,065 | B2 * | 7/2005 | Zhou et al. | 423/584 |
| 7,030,055 | B2 * | 4/2006 | Yaluris et al. | 502/326 |
| 7,109,145 | B2 * | 9/2006 | Ruth et al. | 502/326 |
| 7,247,592 | B2 * | 7/2007 | Echigo et al. | 502/53 |
| 7,345,214 | B2 * | 3/2008 | Xu et al. | 585/752 |
| 7,384,986 | B2 * | 6/2008 | Huang et al. | 518/715 |
| 7,544,634 | B2 * | 6/2009 | Echigo et al. | 502/325 |
| 7,578,986 | B2 * | 8/2009 | Hampden-Smith et al. | 423/220 |
| 7,972,394 | B2 * | 7/2011 | Feaviour et al. | 48/197 R |
| 8,003,565 | B2 * | 8/2011 | Hagemeyer et al. | 502/326 |
| 8,163,669 | B2 * | 4/2012 | Hampden-Smith et al. | 502/439 |
| 2002/0040175 | A1 * | 4/2002 | Baird et al. | 585/700 |
| 2002/0043481 | A1 * | 4/2002 | Baird et al. | 208/137 |
| 2002/0050466 | A1 * | 5/2002 | Baird et al. | 208/137 |
| 2004/0058810 | A1 * | 3/2004 | Baumann et al. | 502/304 |
| 2004/0180000 | A1 * | 9/2004 | Hagemeyer et al. | 423/656 |
| 2004/0209772 | A1 * | 10/2004 | Fukunaga et al. | 502/332 |
| 2004/0223908 | A1 | 11/2004 | Holladay et al. | |
| 2005/0096211 | A1 * | 5/2005 | Takeda et al. | 502/66 |
| 2005/0096212 | A1 * | 5/2005 | Takeda et al. | 502/66 |

OTHER PUBLICATIONS

Kramer et al., "Highly selective CO methanation catalysts for the purification of hydrogen rich gas mixtures" J. Catal. 251 (2007) 410-422.

Men et al., "Selective methanation of carbon oxides in a microchannel reactor—primary screening and impact of gas additives," Catalysis Today 125 (2007) 81-87.

Liu et al., "Selective catalytic methanation of CO in hydrogen rich gases over Ni/ZrO2 catalyst," J. Natural Gas Chem. 17 (2008) 268-272.

Choudhury et al., "Preferential methanation of CO in a syngas involving CO2 at lower temperature range," Applied Catalysis A: General 314 (2006) 47-53.

Rehmat et al., "Selective Methanation of Carbon Monoxide," Ind. Eng. Chem. Prod. Res. Develop. (1970) 512-515.

Cheekatamarla et al., "Selective low temperature removal of carbon monoxide from hydrogen-rich fuels over Cu-Ce-Al catalysts," J. Power Sources 147 (2005) 178-183.

Andersson, "Toward computational screening in heterogeneous catalysis: Pareto-optimal methanation catalysts," J. Catal 239 (2006) 501-506.

Habazaki et al., "CO-methanation of carbon monoxide and carbon dioxide on supported nickel and cobalt catalysts prepared from amorphous alloys," Appl. Catalysis A: General 172 (1998) 131-140.

Panagiotopoulou et al., "Selective methanation of CO over supported noble metal catalysts: Effects of the nature of the metallic phase on catalytic performance," Appl. Catalysts A: General 344 (2008) 45-54.

Takenaka et al., "Complete removal of carbon monoxide in hydrogen-rich gas stream through methanation over supported metal catalysts," Intl. J. Hydrogen Energy 29 (2004) 1065-1073.

Dagle et al., "Selective CO methanation catalysts for fuel processing applications," Applied Catalysis A: General (2007) 213-217.

Bianchi et al., "CO Hydrogenation over Co/SiO2 Catalysts Prepared by Different Ways," Symposium on Fischer-Tropsch Chemistry, 219th Meeting ACS, San Francisco, CA Mar. 2000.

Boerrigter and Rausch "Review of applications of gases from biomass gasification," Jun. 2006, pp. 1-31.

* cited by examiner

SELECTIVE CO METHANATION CATALYSIS

STATEMENT OF GOVERNMENT RIGHTS

This work was conducted with funding by the U.S. Army Communications-Electronics Command and the Office of Naval Research under contracts DAAD05-99-D-7014, CP050746, and DABT63-99-C-0039. The government has certain rights in the invention.

INTRODUCTION

In recent years, fuel processing including hydrogen generation, purification, and storage is drawing a great deal of attention. Fuel cell systems are being developed for several applications, including distributed and portable power generation and for consumer applications[1]. At Pacific Northwest National Laboratory (PNNL) much development has been done in the area of fuel processing for portable power generation using microchannel technology[2,3,4]. Typical fuel processing strategies include steam reforming, partial oxidation and—as a combination of these processes—autothermal reforming[5]. Both preferential oxidation and autothermal reformation introduce oxygen (air) into the system and burn with the reforming fuel to produce the heat required for the reforming reactions(s) to occur. In steam reforming, an external combustor is used to provide the heat. While each technology has advantages and disadvantages, steam reforming is usually used because it offers the highest theoretical efficiency, and produces the highest hydrogen composition[3]. All three reforming strategies, however, may require additional removal of carbon monoxide since the current permeable membrane fuel cell (PEMFC) cannot operate with carbon monoxide levels higher than several ppm.

After reforming of hydrocarbons or higher alcohols and water-gas-shift the CO concentration in the reformer gas is usually reduced to 1-2%[6]. Reforming of methanol can directly yield a CO concentration in the same range with no need for a water-gas-shift step[2]. Either way, further "deep removal" of CO to concentrations below 100 ppm for even the most tolerant fuel cell electrode catalysts is needed.

Three processes have been suggested to reduce CO in the feed; preferential, or selective oxidation, methanation, and membrane separation[7]. Preferential oxidation catalytically oxidizes CO to $CO_2$. Disadvantages include undesirable H2 oxidation and the complexity of having to add precisely controlled amounts of oxygen (air) to the system[6]. Nonetheless, much focus in the literature has been on developing preferential oxidation catalysts and it considered by many to be the primary choice for the removal of CO from hydrogen-rich streams[9]. Hydrogen permeable membranes, usually employing Pd-based membranes, separate hydrogen from the other components (i.e. CO, $CO_2$, $H_2O$). This purification system can be beneficial where pure $H_2$ is desired. The main problems with palladium membranes are that they require a high pressure differential, which takes a toll on overall systems efficiency, they usually require temperatures in excess of 350° C., have a high cost associated with the need for a great amount of noble metal, and membrane lifetime is an issue[6]. Finally, removal of CO by means of methanation has long been known as a possible strategy[6,7,9].

CO methanation by reacting it with hydrogen is shown in Eq (1). The methane produced will act as an inert dilutent and will thus not react in the fuel cell. A disadvantage is the hydrogen penalty. It can be seen from Eq (1) that for every mole of CO, three moles of $H_2$ are also reacted. Furthermore, the undesirable reaction of $CO_2$ methanation is shown in Eq (2). For every mole of $CO_2$, four moles of $H_2$ are reacted[6]. A second undesirable reaction is the reverse-water-gas-shift (RWGS) reaction, shown in Eq (3). $CO_2$, which there is usually 10 to 20 times more of than CO, can shift to CO. In order to minimize Eq (3) the temperature must be kept as low as possible to minimize shift activity as much as possible.

$$CO(g)+3H_2(g)=CH_4(g)+H_2O(g), \Delta H^0=-206 \text{ kg/mol} \quad (1)$$

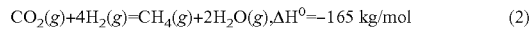

$$CO_2(g)+4H_2(g)=CH_4(g)+2H_2O(g), \Delta H^0=-165 \text{ kg/mol} \quad (2)$$

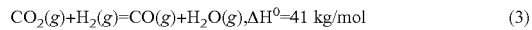

$$CO_2(g)+H_2(g)=CO(g)+H_2O(g), \Delta H^0=41 \text{ kg/mol} \quad (3)$$

Methanation has the benefit of being a somewhat simple, passive process, since it does not require any oxygen (air) addition, and it is only necessary to control the temperature[10]. However, the high hydrogen consumption required for both the CO methanation and undesirable $CO_2$ methanation painfully cuts into fuel efficiency. Thus, many do not believe methanation is feasible at CO concentrations in the percent range[6,7]. Some have proposed using methanation downstream from other CO removal processes, such as preferential CO oxidation, to cleanup any remaining amounts of CO (usually <0.1%).

Baker et al. reported using a ruthenium or rhodium on an alumina support catalyst to selectively hydrogenate carbon monoxide containing high concentrations of carbon dioxide. However, the CO feed concentration used of 0.29% was considerably lower than the percent range needed for current applications as a stand alone process. Additionally, relatively low feed flowrates from GHSV=500-2000 $hr^{-1}$ were reported. Microreactors at PNNL typically operate at much higher throughputs from 10,000-60,000 $hr^{-1}$ to maximize reactor efficiency. Even with these lower flowrates the operating temperature ranges where the CO remained below 100 ppm, are undesirably small. Also, only temperatures up to 220° C. were reported. It was found that for a given feed gas, the critical temperature range is shifted somewhat higher as the feed gas average space velocity is increased and also as the feed gas water vapor content is increased.

Rehmat et. al. investigated this process at much higher space velocities of 9000-36,000 $hr^{-1}$ and higher temperatures of 125° C.-300° C.[12]. A similar feed as that of Baker et. al. was used (3000 ppm CO). The higher space velocity tests did not yield CO outputs lower than 100 ppm. They reported nickel catalysts as being active but that ruthenium was the most effective CO selective methanation catalyst tested. Furthermore, they showed that in the absence of $CO_2$ the methanation reaction goes to almost completion at temperatures higher than that necessary to achieve the minimal CO output, when $CO_2$ is added (under similar space velocities). Thus, it was suggested that while it is possible that for all the temperatures investigated the CO methanation reaction Eq (1) takes place along with the reverse shift reaction Eq (3), the latter is less noticeable up to an optimal temperature. After reaching this temperature where the CO is lowest, the reverse shift reaction begins. Bohm et. al. described a process utilizing in part selective methanation using a Ru— and $TiO_2$— containing catalyst[13]. Van Keulen patented a two-stage, two-temperature range methanation process which utilized a Ru-based catalyst[14]. In a recent work by Otsuka et. al., several supports and metals were studied for CO methanation[15]. The most promising catalysts—Ni/$ZrO_2$ and Ru/$TiO_2$ catalysts—were studied in the presence of CO2. It was found that while these catalysts can catalyze the methanation of CO selectively in the presence of $CO_2$ the temperature ranges effective are narrow for both catalysts. For example, for the operating conditions reported, the methane output increased 4-fold in the 40° C. temperature range once the CO has reached reasonable levels (<100 ppm). It was also found that Ru metal crystallites with smaller diameters are effective for CO methanation. They hypothesized that the number of active sites for CO methanation increases as the dispersion of metal becomes higher.

Despite these efforts, there remains a need for better catalysts and processes for selective CO methanation in the presence of carbon dioxide.

REFERENCES

[1] S. Ahmed, et al, *Catalysis Today.* 2002, 77, 3-4.
[2] D. Palo, J. Holladay, R. Dagle, Y. Chin, Submitted to *Fuel Processing for Portable Power.* 2004.
[3] J. Holladay, E. Jones, M. Phelps, J. Hu, *Journal or Power Sources.* 2002, 108, 21-27.
[4] G. Xia, J. Holladay, R. Dagle, E. Jones, Y. Wang, Submitted to *Chemical Engineering and Technology.* 2004.
[5] P. Urban, et al, *Applied Catalysis A: General.* 2001, 221, 467.
[6] G. Hoogers, *Fuel Cell Technology Handbook.* 2003, 5-12-5-14.
[7] C. Song, *Catalysis Today.* 2002, 77, 41.
[8] P. Snytnikov, et. al., *Applied Catalysis A: General.* 2003, 239, 149.
[9] P. F. Joensen, J. Rostrup-Nielsen., *Journal of Applied Power Sources.* 2002, 105, 199.
[10] L. Pettersson, R. Westerholm, *International Journal of Hydrogen Energy.* 2001, 26, 255-256.
[11] B. Baker, J. Huebler, H. Linden; J. Meek, U.S. Pat. No. 3,615,164. 1971.
[12] A. Rehmat, S. Randhava, *Ind. Eng. Chem. Res. Develop.,* 1970, Vol 9, No. 4, 512-515.
[13] G. Bohm, T. Staneff, J. Steinwandel, U.S. Pat. No. 5,904,913. 1999.
[14] V. Keulen, U.S. Pat. No. 6,407,307. 2001.
[15] K. Otsuka, S. Takenaka, T. Shimizu, *International Journal of Hydrogen Energy.*, 2004, 29, 1065-1073.

SUMMARY OF THE INVENTION

The invention provides a catalyst comprising Ru disposed on an alumina support. The Ru comprises at least about 3 weight % of the catalyst. Furthermore, the catalyst is characterizable by a methanation selectivity (that is, it possesses the intrinsic property of methane selectivity), as measured by a test in which a gas mixture containing 0.9% CO, 24.5% $CO_2$, 68.9% $H_2$, and 5.7% $H_2O$ is exposed to the catalyst at a GHSV of 13,500 $hr^{-1}$ and a temperature of 240° C. wherein a product gas is produced, such that 20% or less of the $H_2$ is consumed and the product gas comprises 100 ppm CO or less.

The invention also provides a method of methanating CO, comprising: flowing a gas comprising CO, $H_2$, and $CO_2$ in contact with a catalyst comprising Ru disposed on an alumina support; wherein the Ru comprises at least about 3 weight % of the catalyst; and wherein the gas comprises at least 0.5% CO. The gas contacts the catalyst at a temperature of about 210° C. to about 290° C. and a GHSV of at least 10,000 $hr^{-1}$; and the CO reacts with the $H_2$ to form $CH_4$ such that the gas is converted to a product gas that contains 100 ppm CO or less and further, the $H_2$ that is consumed in the method is no more than 10% in excess of that needed to convert all the CO to $H_2$.

DETAILED DESCRIPTION OF THE INVENTION

Figure 1A:
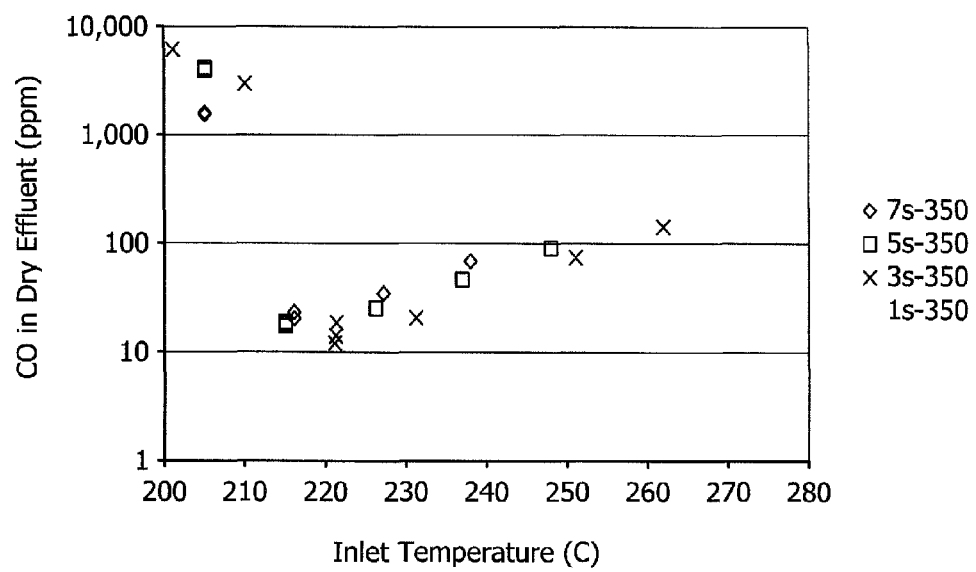
FIG. 1: Effect of Ru metal loading and temperature on a) CO concentration in the effluent and b) $H_2$ consumption (approximate feed composition: 0.9% CO, 24.5% $CO_2$, 68.9% $H_2$, 5.7% $H_2O$, SV=13,500 $hr^{-1}$).

The catalyst comprises Ru on an alumina support. The catalyst preferably comprises at least about 3% Ru (the term "%" means weight percent unless otherwise specified). In some embodiments, there is 3% to about 7% Ru. The alumina may be any phase or combination of phases, but in some preferred embodiments is primarily or essentially gamma (γ) alumina. Other components may be present, but in some preferred embodiments, the catalyst consists essentially of Ru and alumina. Preferably, the Ru is present in crystallite having an average size greater than 10 nm (as measured by XRD, see below). Preferably, the catalyst has a surface area of at least 100, more preferably at least 150 $m^2/g$ (as measured by BET).

As is well-known, catalyst properties can vary depending on the method by which they are prepared. Thus, catalysts having the same composition, may be very different, in which case it is best to characterize these catalysts by their properties. Preferably, the catalyst has a methanation selectivity, such that, when the catalyst is exposed to a gas containing 0.9% CO, 24.5% $CO_2$, 68.9% $H_2$, and 5.7% $H_2O$ at a GHSV of 13,500 $hr^{-1}$, and a temperature of 240° C., 20% or less of the $H_2$ is consumed and the product gas comprises 100 ppm CO or less. This property, methane selectivity, is to be measured as described in the examples at ambient pressure (about 1 atm). More preferably, when tested as above, the catalyst has a methane selectivity such that about 15% or less of the $H_2$ is consumed (more preferably about 10% or less) and the product gas comprises 100 ppm CO or less (more preferably 60 ppm or less, and still more preferably 30 ppm or less). In some embodiments, when tested as above, the catalyst has a methane selectivity such that about 5% to 20% or less of the $H_2$ is consumed and the product gas comprises about 20 to 100 ppm CO or less. Alternatively, or in addition, the the catalyst has a methanation selectivity, such that, when the catalyst is exposed to a gas containing 0.9% CO, 24.5% $CO_2$, 68.9% $H_2$, and 5.7% $H_2O$ at a GHSV of 13,500 $hr^{-1}$, and a temperature of 220° C., 10% (preferably 5%) or less of the $H_2$ is consumed and the product gas comprises 50 ppm (preferably 30 ppm) CO or less. Methane selectivity is an intrinsic property of the catalyst.

The catalyst is preferably made by impregnating an alumina support with a Ru-containing solution. Typically (but not necessarily), this is followed by drying and reducing in the presence of hydrogen at elevated temperature. In some preferred embodiments, all the Ru is added in a single impregnation.

In the inventive methods, a gas composition before exposure to the Ru catalyst is termed an "inlet gas" (although it need not flow through an actual inlet). A gas containing a substantial amount of CO (at least 0.5% CO) is methanated: In some embodiments, the inlet gas comprises at least 2% CO, in some embodiments 0.5% to 10%, in some embodiments 0.5% to 2%. The gas also comprises $CO_2$ and $H_2$. The gas may also contain $H_2O$ as well as other components. In some embodiments, the inlet gas comprises at least 10% $CO_2$, in some embodiments at least 20% $CO_2$. In some embodiments, the inlet gas comprises at least 10% $H_2$, in some embodiments 10% to 80% $H_2$. In some embodiments, the inlet gas comprises at least 1% $H_2O$, in some embodiments at least 2% $H_2O$, and in some embodiments 1% to 20% $H_2O$. The method operates at a temperature of about 210° C. to about 290° C. (or any temperature or subset of temperatures within this range as shown in the examples). In some embodiments, the method operates at a temperature of about 220° C. to about 250° C. Gas flow through the catalyst is rapid, a GHSV of at least 10,000 $hr^{-1}$, preferably at least 13,000 $hr^{-1}$. The method produces a product gas that contains 100 ppm CO or less more preferably 60 ppm or less, and still more preferably 30 ppm or less CO, and in some embodiments, 10 to 100 ppm CO. Ideally, only enough $H_2$ is consumed to remove CO. Preferably, the $H_2$ that is consumed in the method is no more than 10% (more preferably no more than 5%, in some embodiments about 2% to 10%) in excess of that needed to convert all the CO to $H_2$.

In its broader aspects, the invention is not limited to a particular type of reactor. The catalyst may be disposed, for example, on reactor walls (microchannel walls in the case of a microchannel reactor) with a bulk flow path through the reactor (or through a microchannel) or in a packed bed. In some preferred embodiments, the invention comprises a microchannel reactor that comprises a Ru on alumina catalyst. Microchannel reactors are known to provide advantages of short distances for mass and heat transfer. A microchannel has at least one dimension of 1 cm or less, more preferably at least 0.5 cm or less, and still more preferably 2 mm or less. Preferably, a heat transfer channel, preferably, a heast transfer microchannel or array of microchannels is disposed adjacent to a reactor microchannel or array of reactor microchannels comprising a Ru on alumina catalyst. In some preferred embodiments, the invention includes a planar array of reactor microchannels adjacent a planar array of heat exchange microchannels. The invention includes microchannel reactors comprising the inventive catalyst. The invention also includes methods of conducting a methanation reaction in a microchannel reactor.

Examples

Supported metal catalysts were prepared by impregnation. A neutral γ-$Al_2O_3$ support (Engelhard Corp.) was pre-calcined at 500° C. for 2 hrs. A $TiO_2$ P25 extrudate (Degussa) was calcined at 700° C. for 5 hrs. Zr(OH) powder (Aldrich) was calcined at 550° C. for 3 hrs to form $ZrO_2$. All supports were kept at 110° C. prior to the incipient-wetness impregnation step. Dilute and concentrated solutions of ruthenium were used requiring multiple and single-step impregnations, respectively. For the multi-impregnations on the alumina support and zirconia, and titania supported catalysts a ruthenium (II) nitrosyl nitrate solution (containing 1.5% Ru, Aldrich) was used. For the single impregnations on alumina support a concentrated ruthenium (III) nitrosyl nitrate solution (containing 9.9% Ru, Colonial Metals) was used. After each impregnation the wet sample was dried in air for at least 8 hour at 110° C. After the final impregnation and drying the sample was calcined at 350° C. for 3 hours.

Selective CO methanation was conducted in a 4 mm i.d. fixed-bed quartz tubular reactor at ambient pressure. Two K-type thermal couple reactors were installed in the reactor in such a way to measure the temperatures of the inlet and catalyst bed. 0.10 g of catalyst was packed in the reactor and the catalyst was reduced using a 10% $H_2/N_2$ gas mixture at 350° C. for 2 hours prior to the run. For one test the catalyst was reduced at 600° C. for 2 hours. A pre-mixed gas containing 1% CO, 26% $CO_2$, and 73% $H_2$ (Matheson) was introduced into the system using a Brooks Mass Flow Controller (5850E series). Water was fed into a micro-channel vaporizer using a syringe pump (Cole Parmer 74900 series). The water was vaporized at 200° C. where it was mixed with the pre-mix gas and fed to the reactor. The resulting feed mixture containing approximately 0.9% CO, 24.5% $CO_2$, 68.9% $H_2$, and 5.7% $H_2O$. A moisture condenser and dry-rite bed were used to remove liquid materials from the products. The gaseous effluent was analyzed using a MTI GC (Model Q30L) equipped with MS-5A and PPQ columns and a thermal conductivity detector (TCD). For measuring CO concentrations less than 1000 ppm, an infrared ZRH gas analyzer (California Analytical Instruments) was used. Unless otherwise noted temperature profiles were run maintaining a space velocity (SV) of 13,500 $hr^{-1}$.

X-ray diffraction (XRD) patterns were collected on a Philips X'Pert MPD (Model PW3040/00) diffractometer using Cu Kα radiation. The diffraction patterns were analyzed using Jade 6 (Materials Data Inc., Livermore, Calif.) and the Powder Diffraction File database (International Centre for Diffraction Data, Newtown Square, Pa.). The crystallite sizes were determined from the diffraction data using the Scherrer equation and a Gaussian shape factor of 0.9. All peaks above the background were profile-fitted using Pearson VII models with an exponent of 1.5. The full widths at half maximum (FWHMs) were corrected for instrumental broadening, and the instrument function was determined from a measurement of NIST SRM 640b (Silicon) under the study conditions. The corrected FWHM's of all peaks were utilized in the Sherrer calculations, so the reported crystallite sizes are independent of direction (hkl and represent average values in all cases. BET measurement ($N_2$ adsorption/desorption) was obtained using an Autosorb-1 (Quantachrome) apparatus.

Results and Discussion

Catalyst Characterizations

A summary of the catalyst prepared, including the crystallite sizes, as determined from XRD data, and BET results are shown in Table 1. As a general trend, the crystallite sizes increase with increasing Ru loading. When comparing catalysts prepared with the same metal loading, the crystallite sizes increase with higher reduction temperatures. When comparing the single and multiple impregnated 5% Ru/$Al_2O_3$ catalysts, the average crystallite size was 9.1 to 14.4 nm, respectively. Surface area measurements (BET) indicate that the catalysts made with the alumina support have high surface areas of approximately 233 $m^2/g$, while the $ZrO_2$ and $TiO_2$ supported catalysts contain much lower surface areas of approximately 60 and 9 $m^2/g$, respectively. Crystallize sizes cannot be determined from XRD spectrum for the $ZrO_2$ and $TiO_2$ supported catalysts due to metal and support peak overlap.

TABLE 1

Summary of Catalysts Prepared including XRD crystallite sizes and BET surface areas.

| Catalyst ID[a] | Ru Amount (wt. %) | Support material | # Metal Solution Impregnations | Reduction Temperature (° C.) | Crystallite Size, XRD (nm) | BET Surface Area (m²/g) |
|---|---|---|---|---|---|---|
| 1s-350 | 1 | Al$_2$O$_3$ | 1 | 350 | 3.8 | |
| 3s-350 | 3 | Al$_2$O$_3$ | 1 | 350 | 10.1 | 235 |
| 3s-600 | 3 | Al$_2$O$_3$ | 1 | 600 | 13.7 | |
| 3s-000[b] | 3 | Al$_2$O$_3$ | 1 | none | — | |
| 3m-350 | 3 | Al$_2$O$_3$ | 3 | 350 | 10.3 | 233 |
| 5s-350 | 5 | Al$_2$O$_3$ | 1 | 350 | 9.1 | |
| 5m-350 | 5 | Al$_2$O$_3$ | 5 | 350 | 14.4 | |
| 7s-350 | 7 | Al$_2$O$_3$ | 1 | 350 | 11.1 | |
| 3-ZrO2 | 3 | ZrO$_2$ | 6 | 350 | n/a | 69 |
| 3-TiO2 | 3 | TiO$_2$ | 6 | 350 | n/a | 9 |

[a]The first number used for the catalyst identification nomenclature is the ruthenium percentage. The "s" and "m" signify single and multiple impregnations, respectively. The latter number represents the reduction temperature. Thus, "1s-350" represents a 1% Ru/Al$_2$O$_3$ catalyst, done with a single incipient-wetness ruthenium solution impregnation, reduced at 350° C.
[b]The 3s-000 catalyst was prepared via a single-step impregnation without any reduction pre-treatment.

The Effects of Ru Loading

Figure 1B:
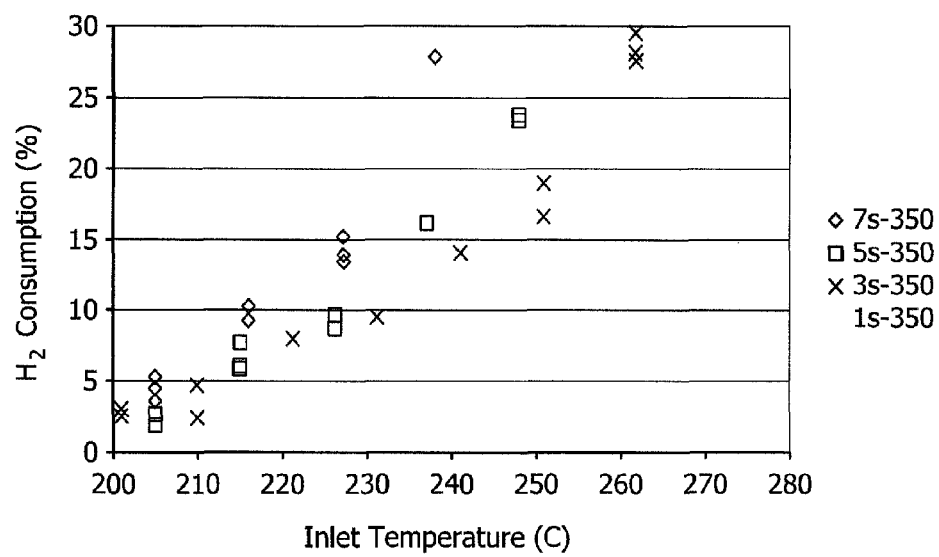

To study the effects of Ru loading on catalyst performance, a series of single impregnated catalysts were studied. In the log-plot, FIG. 1a, it can be seen each catalyst will have a quick decrease in CO, usually within 20-30° C., reach a minimum CO level, then begin to slowly increase CO outputs. The CO first begins to methanate, described by Eq (1). Then, when the CO level is much reduced, CO$_2$ methanation, Eq (2), and the reverse shift reactions, Eq (3), take place. The reverse shift reaction occurring is indicated by the slow increase in CO level. With CO$_2$ in the feed, the reverse shift reaction becomes more prominent as the temperature increases, thus, increasing CO outputs. This results in a temperature window in which the CO output will low enough for applicable use (typically somewhere <100 ppm) before CO levels rise to a level out of a useful range. In FIG. 1b it can be seen that the hydrogen consumption increases more rapidly once the majority of the CO is hydrogenated. At this point, CO$_2$ methanation, Eq (2) begins to take place. With increasing temperature hydrogen consumption continues to increase.

The extent of CO output and hydrogen consumption with temperature is affected by Ru loading. The CO methanation activity, depicted in FIG. 1a, generally increases with metal loading. The 1% loading barely reaches a CO level of 100 ppm, at 250° C., before CO levels begin to increase. The other 3 catalysts are considerably more active reaching a much lower CO level between 10-20 ppm, at temperatures between 215° C. and 220° C. The 3% loading catalyst has a slightly less active CO output profile than the 7% and 5% loading catalysts, which have similar profiles. This suggests that there is a maximum metal loading where any further increase fails to enhance CO methanation performance. However, the hydrogen consumption profiles show dramatic differences between all four catalysts. With increasing metal loading, hydrogen consumption increases. CO$_2$ methanation more quickly occurs with increasing metal loadings. This is not surprising since it has been established that methanation for both CO$_2$ and CO will be enhanced with as the number of active sites increase[15]. Thus, a balance of activity and selectivity must occur, with as large a temperature window as possible for optimum performance. A catalyst should be chosen to be active enough but not overly active where CO$_2$ methanation quickly dominates. Methanation over the single-impregnation 3% Ru catalyst was found to have the same CO output as that of the higher loading catalysts and exhibited far superior selectivity to the minimization of CO$_2$ methanation (and thus, hydrogen consumption).

The Effects of Preparation and Pretreatment

Figure 2A:
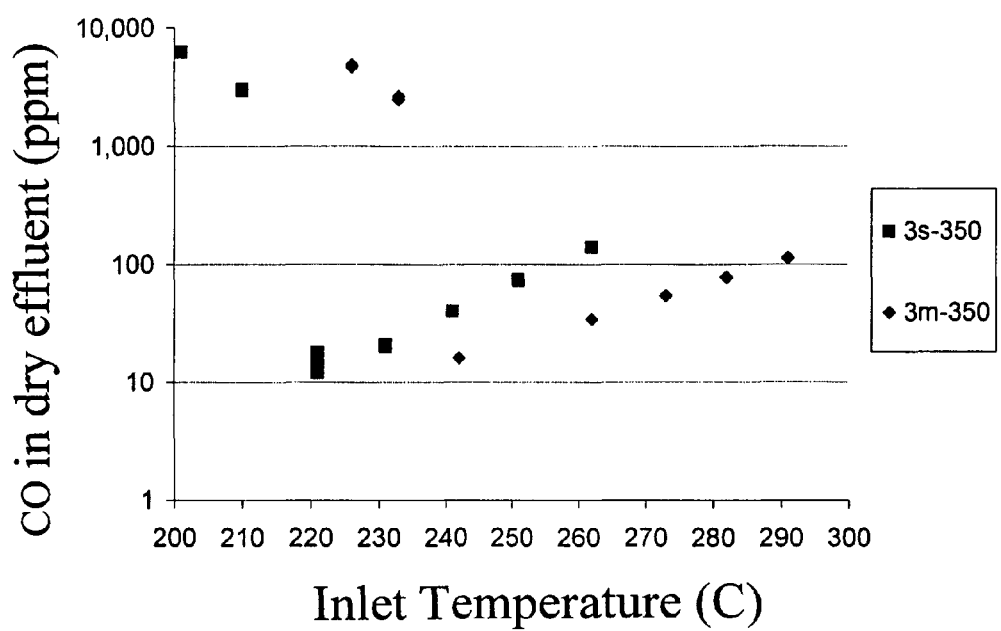
FIG. 2: Effect of preparation and temperature, for a 3% Ru metal loading catalyst, on a) CO concentration in the effluent and b) $H_2$ consumption (approximate feed composition: 0.9% CO, 24.5% $CO_2$, 68.9% $H_2$, 5.7% $H_2O$, SV=13,500 $hr^{-1}$).
Figure 2B:
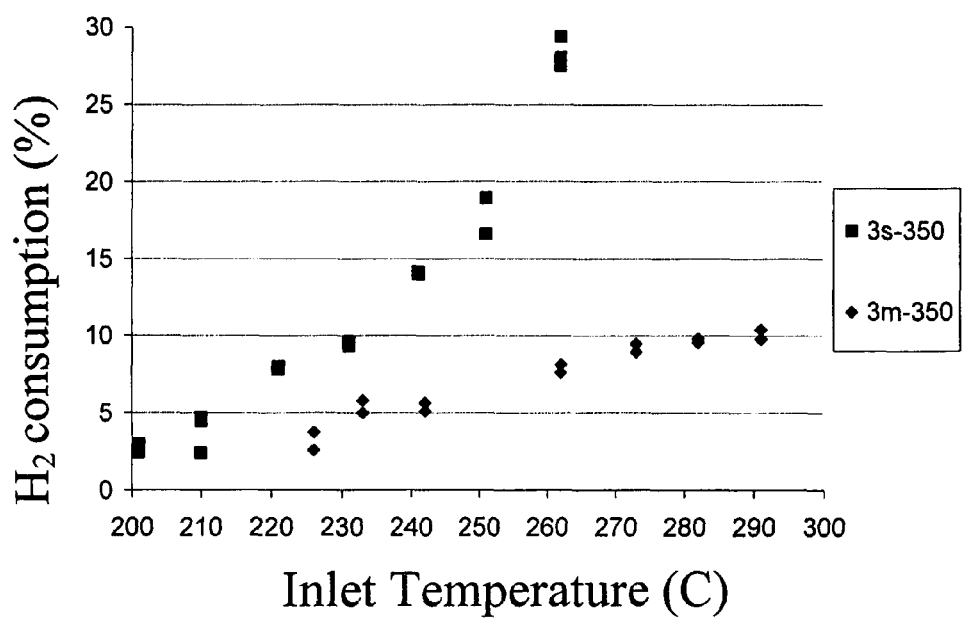
Figure 3A:
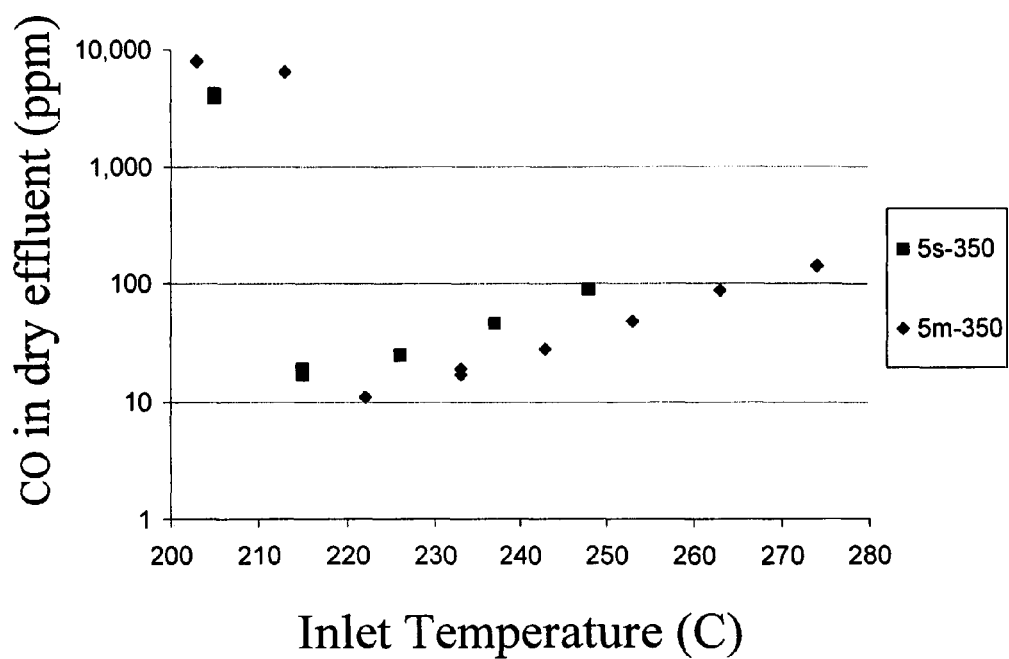
FIG. 3: Effect of preparation and temperature, for a 5% Ru metal loading catalyst, on a) CO concentration in the effluent and b) $H_2$ consumption (approximate feed composition: 0.9% CO, 24.5% $CO_2$, 68.9% $H_2$, 5.7% $H_2O$, SV=13,500 $hr^{-1}$).
Figure 3B:
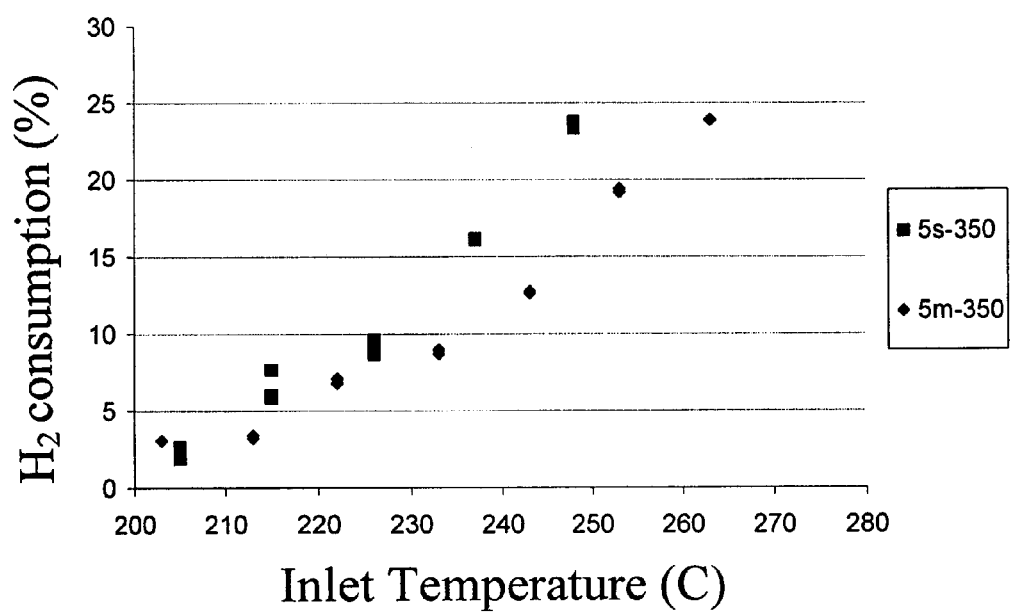

It was found that the catalyst performance is greatly affected by the impregnation method. In FIG. 2a it is shown that when comparing catalysts with single and multiple impregnations, the catalyst with the single dispersion is more active for CO removal. Catalyst 3 m-350 has a CO profile shifted to the right. This also corresponds to a subsequent increase in CO$_2$ methanation. FIG. 2b shows the hydrogen consumption increasing substantially more quickly for the single impregnated catalyst. The single-step impregnation method is believed to yield a better dispersed catalyst and thus, contain more active sites accelerating the not only the CO, but also CO$_2$, methanation. This phenomena is also observed for the 5% Ru loading catalyst, as depicted in FIGS. 3a and 3b. The single step impregnated catalyst has a more active CO profile, shifted to the left. However, it also methanates CO$_2$, and thus consumes hydrogen, more readily. From Table 1, it can be seen that the crystallite sizes for the 5 s-350, and 5 m-350 catalysts are 9.1 and 14.4 nm, respectively, thus, indicating the dispersion differences. It should be noted that there was no detectable crystallite size differences between the 3 s-350 and 3 m-350 catalyst from the XRD spectrum. However, additional H2 chemisorption experiments performed on these two catalysts suggests that there is indeed an increase in dispersion with the single step, when compared to the multi-step catalyst, as would be expected. It is thought that while the XRD profile fitting may suggest general, average crystallite size trends, it is not completely accurate and only represents approximate ranges.

The temperature window comparisons between the two impregnation types have approximately the same CO level range. For example, catalyst 3 s-350 has a temperature range between approximately 220° C. and 260° C. where the CO level is less than 100 ppm. Catalyst 3 m-350 has a window between 240° C. and 280° C. where the CO remains below 100 ppm. It is believed that the CO level rises more quickly for the 3 s-350 catalyst because CO$_2$ methanation is occurring more rapidly, thus also facilitating the reverse shift functionality. Thus, while the better dispersed catalysts are initially more active, the temperature windows for a given CO level are approximately the same when compared to the worse dispersed counterparts. Furthermore, the significant differences in selectivity suggest the larger crystallite sizes provide a more optimum range of operation. The 3 m-350 catalyst consumes no more than 10% of the hydrogen, along the range studied.

Figure 4A:
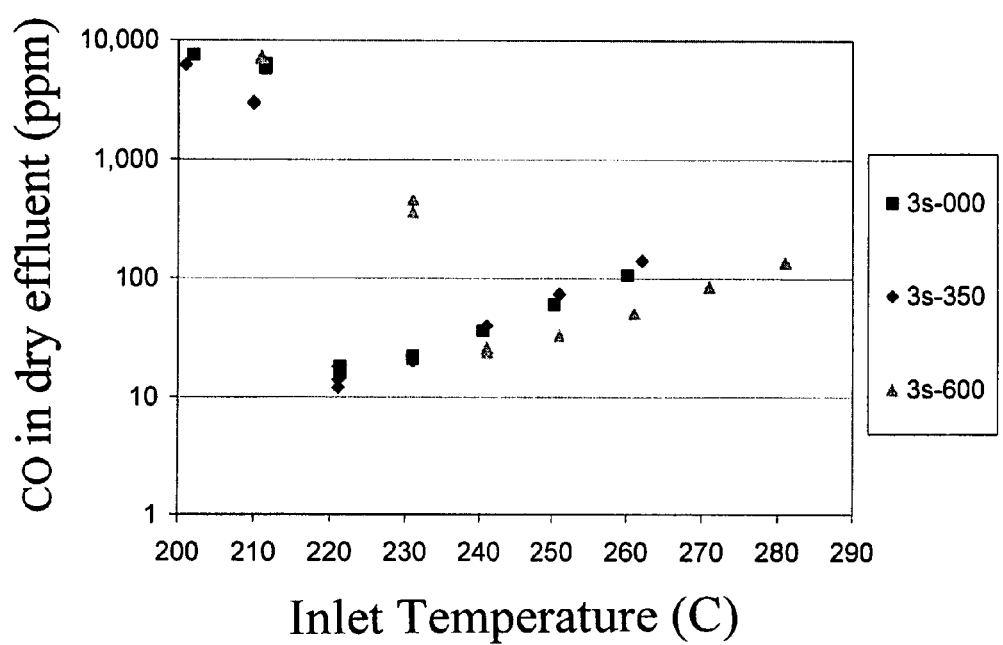
FIG. 4: Effect of reduction temperature and operating temperature, for a 3% Ru metal loading catalyst, on a) CO concentration in the effluent and b) $H_2$ consumption (approximate feed composition: 0.9% CO, 24.5% $CO_2$, 68.9% $H_2$, 5.7% $H_2O$, SV=13,500 $hr^{-1}$).
Figure 4B:
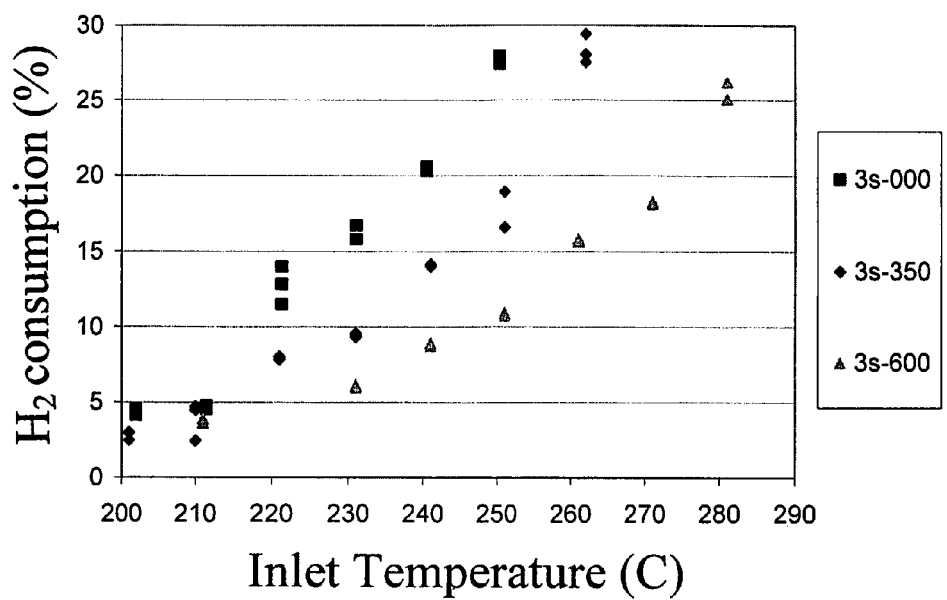

The effect of reduction temperature was also studied. A 3% loading was tested with no reduction, and reduction at 350° C. and 600° C. Activity was similar between the catalysts without reduction and 350° C. reduction. It is thought that while the first catalyst did not undergo a pretreatment reduction, the metal is quickly reduced to metallic Ru since the feed contains approximately 70% hydrogen. Thus, the ruthenium will sinter according to the reaction temperature. Since the operating range never exceeded 300 C, the crystallite size under operating conditions should be smaller, than catalyst reduced at 350° C. Catalyst reduced at 600° C. has a shift in the CO profile to higher temperature. Correspondingly, the hydrogen consumption decreases with increasing reduction temperature, as shown in FIG. 4b. These findings further indicate performance changes according to crystallite sizes, as seen when comparing catalysts with varying impregnation schemes, as described above.

The Effect of Support

Figure 5A:
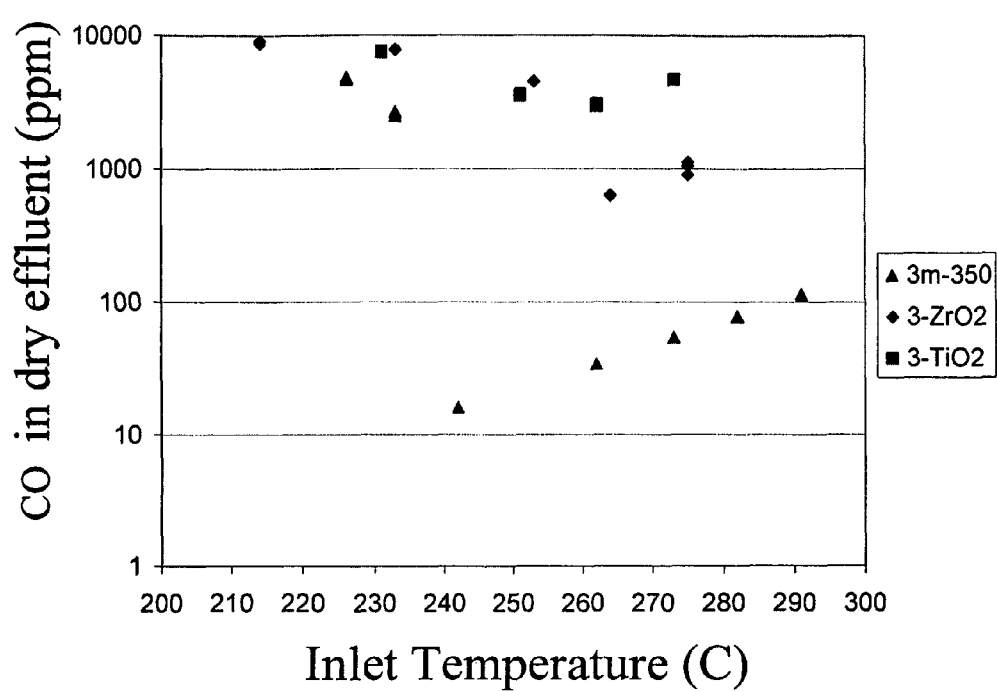
FIG. 5: Effect of support for 3% loading and temperature on a) CO concentration in the effluent and b) $H_2$ consumption (approximate feed composition: 0.9% CO, 24.5% $CO_2$, 68.9% $H_2$, 5.7% $H_2O$, SV=13,500 $hr^{-1}$).
Figure 5B:
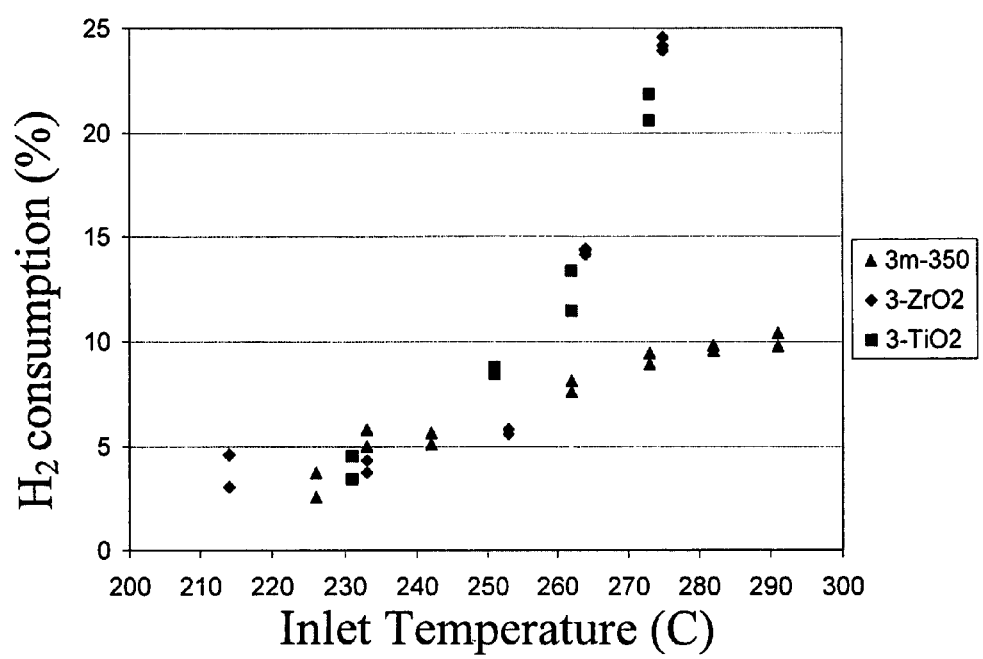

To investigate the effect of support on performance, $ZrO_2$ and $TiO_2$ supported catalysts were studied. From FIG. 5a it is seen that the activity of the $Al_2O_3$ far exceeds that of the other supports. The minimum CO level for the 3-$ZrO_2$ and 3-$TiO_2$ catalysts was 3080 ppm, and 636 ppm, respectively. Furthermore, the hydrogen consumption quickly accelerates for these catalysts once a minimum CO level is attained, as shown in FIG. 5b. This can be attributed to the fact that the surface areas are much less; 69 and 9 $m^2/g$ for the zirconia and titania supports, respectively (found in Table 1). Lower surface area catalysts yield more poorly dispersed catalysts. The $Al_2O_3$ catalyst with a higher surface area of 233 $m^2/g$, and better dispersion, enables CO methanation to occur quicker, at lower temperatures, and more selectively, before $CO_2$ methanation predominates at higher temperatures. The activity increases with surface area in the order of $Al_2O_3 > ZrO_2 > TiO_2$.

Stability Under Oxidizing Conditions

Figure 6A:
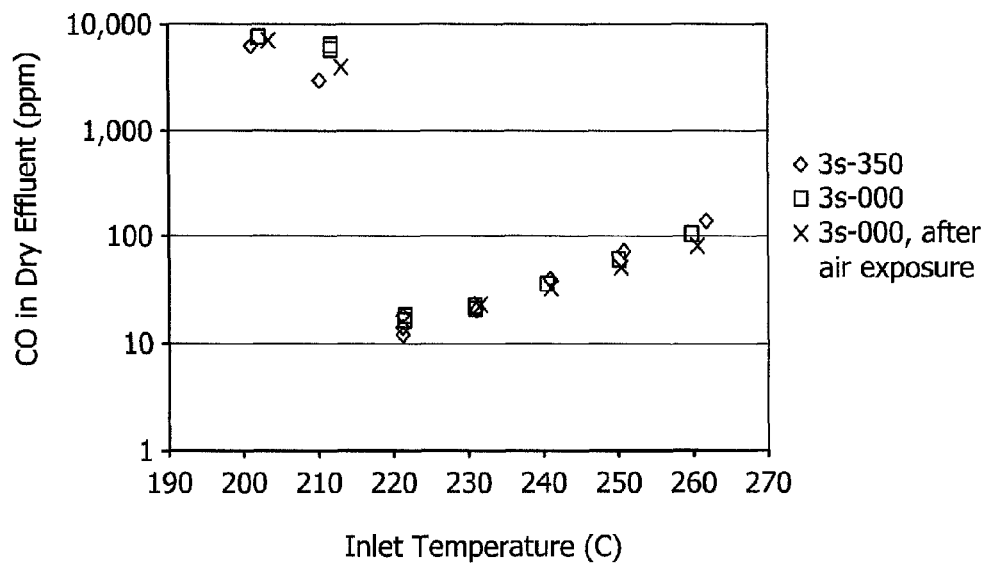
FIG. 6 shows catalyst stability after air exposure in terms of a) CO in effluent and b) $H_2$ consumption.
Figure 6B:
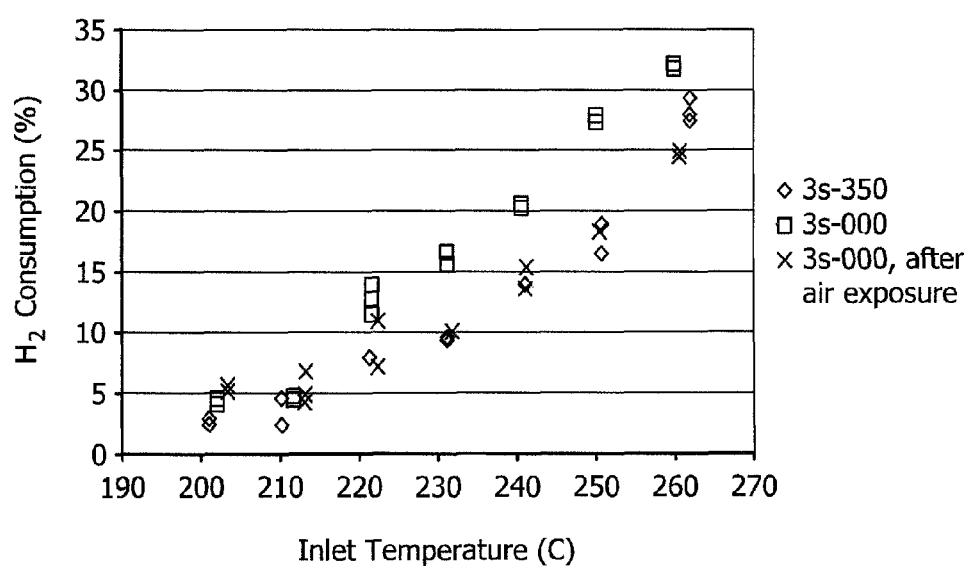

One concern some have concerning fuel processing catalysis has to do with the catalyst stability under actual operating conditions. One potential problem could be catalyst exposure to air, possibility at reaction temperatures. FIG. 4 shows that catalyst is relatively active without any pretreatment, although the catalyst could be optimized with increasing reduction temperature. The durability of the catalyst was further tested by exposing the catalyst to air at reaction temperature (260° C.) for one hour, shutting down to room temperature under air, then starting up the next day after having left the catalyst flowing under air. From FIG. 6 it can be seen that the catalyst performance was not adversely affected. In fact, the catalyst selectivity was enhanced, as shown in FIG. 6b. After having run under operating conditions up to 300° C., the non-prereduced catalyst had selectivities comparable to the catalyst prereduced at 350° C., even after being exposed to air at reaction temperatures.

The performance of selective CO methanation catalysis is markedly affected by metal loading, pretreatment, and reduction parameters. Surprisingly, these conditions can be controlled to result in a highly active and selective CO methanation catalyst. It was shown that a high surface area support produces superior CO activity. The crystallite size may be controlled, and preferably increased, to suppress $CO_2$ methanation.

What is claimed:

1. A catalyst comprising:
   Ru disposed on an alumina support;
   wherein the Ru comprises at least about 1 weight % of the catalyst; and
   wherein the catalyst is characterizable by a methanation selectivity, as measured by a test in which a gas mixture containing 0.9% CO, 24.5% $CO_2$, 68.9% $H_2$, and 5.7% $H_2O$ is exposed to the catalyst at a GHSV of 13,500 $hr^{-1}$ and a temperature of 240° C. wherein a product gas is produced,
   such that 20% or less of the $H_2$ is consumed and the product gas comprises 100 ppm CO or less.

2. The catalyst of claim 1 comprising 3% to about 7% Ru.

3. The catalyst of claim 1 consisting essentially of Ru and alumina.

4. The catalyst of claim 3 wherein the Ru has an average particle size of 10 nm or greater as measured by XRD.

5. The catalyst of claim 1 wherein the Ru comprises at least about 3 weight % of the catalyst; and
   having a surface area of at least 150 $m^2/g$.

6. The catalyst of claim 5 wherein the catalyst is characterizable by a methanation selectivity, as measured by a test in which a gas mixture containing 0.9% CO, 24.5% $CO_2$, 68.9% $H_2$, and 5.7% $H_2O$ is exposed to the catalyst at a GHSV of 13,500 $hr^{-1}$ and a temperature of 240° C. wherein a product gas is produced,
   such that 15% or less of the $H_2$ is consumed and the product gas comprises 30 ppm CO or less.

7. The catalyst of claim 6 consisting essentially of Ru and alumina.

8. The catalyst of claim 7 wherein the alumina consists essentially of gamma alumina.

9. The catalyst of claim 5 wherein the catalyst is characterizable by a methanation selectivity, as measured by a test in which a gas mixture containing 0.9% CO, 24.5% $CO_2$, 68.9% $H_2$, and 5.7% $H_2O$ is exposed to the catalyst at a GHSV of 13,500 $hr^{-1}$ and a temperature of 220° C. wherein a product gas is produced,
   such that 5% or less of the $H_2$ is consumed and the product gas comprises 30 ppm CO or less.

10. The catalyst of claim 9 comprising 3% to about 7% Ru.

11. The catalyst of claim 10 wherein the Ru has an average particle size of 10 nm or greater as measured by XRD.

12. The catalyst of claim 5 wherein the Ru has an average particle size of 10 nm or greater as measured by XRD.

13. The catalyst of claim 1 wherein the catalyst is characterizable by a methanation selectivity, as measured by a test in which a gas mixture containing 0.9% CO, 24.5% $CO_2$, 68.9% $H_2$, and 5.7% $H_2O$ is exposed to the catalyst at a GHSV of 13,500 $hr^{-1}$ and a temperature of 240° C. wherein a product gas is produced,
   such that 5% to 20% of the $H_2$ is consumed and the product gas comprises about 20 to 100 ppm CO.

14. The catalyst of claim 1 made by impregnating an alumina support with a Ru-containing solution in a single impregnation.

15. A catalyst comprising:
    Ru disposed on an alumina support;
    wherein the Ru comprises at least about 1 weight % of the catalyst; and
    wherein the catalyst is characterizable by a methanation selectivity, as measured by a test in which a gas mixture containing 0.9% CO, 24.5% $CO_2$, 68.9% $H_2$, and 5.7% $H_2O$ is exposed to the catalyst at a GHSV of 13,500 $hr^{-1}$ and a temperature of 240° C. wherein a product gas is produced,
    such that 20% or less of the $H_2$ is consumed and the product gas comprises 100 ppm CO or less; and
    wherein the Ru has an average particle size of 10 nm or greater as measured by XRD.

16. The catalyst of claim 15 wherein the alumina comprises gamma alumina.

17. The catalyst of claim 15 comprising 3% to about 7% Ru.

* * * * *